Jan. 1, 1952        T. VIGMOSTAD        2,580,487
FOLDABLE TOP FOR VEHICLE BODIES
Filed Oct. 17, 1949        3 Sheets-Sheet 2
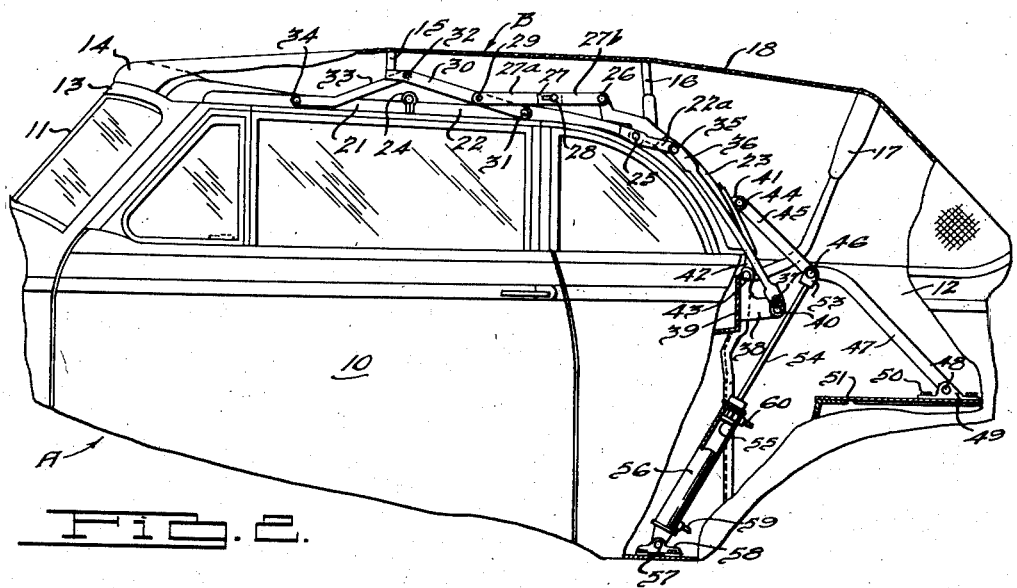
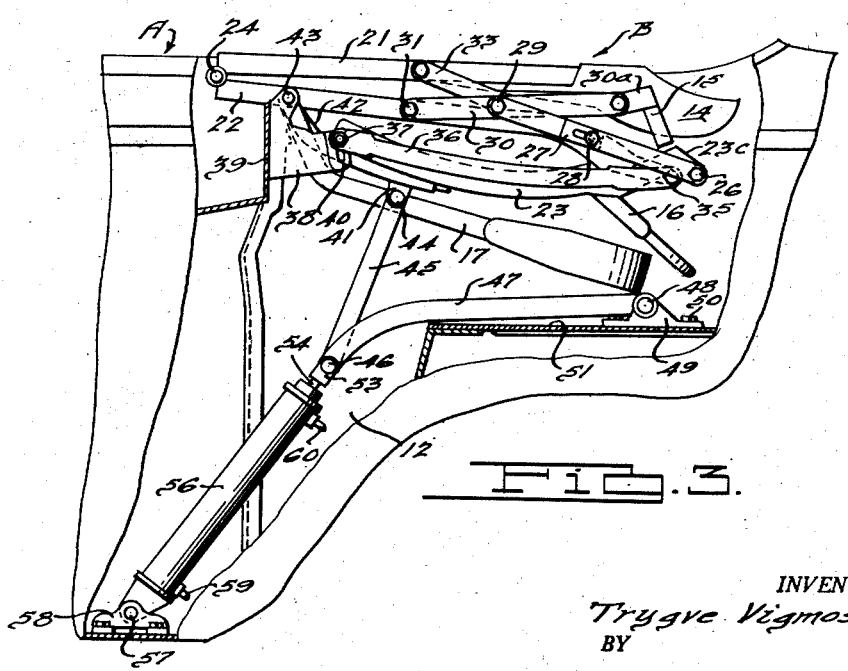
INVENTOR.
Trygve Vigmostad.
BY
ATTORNEY.

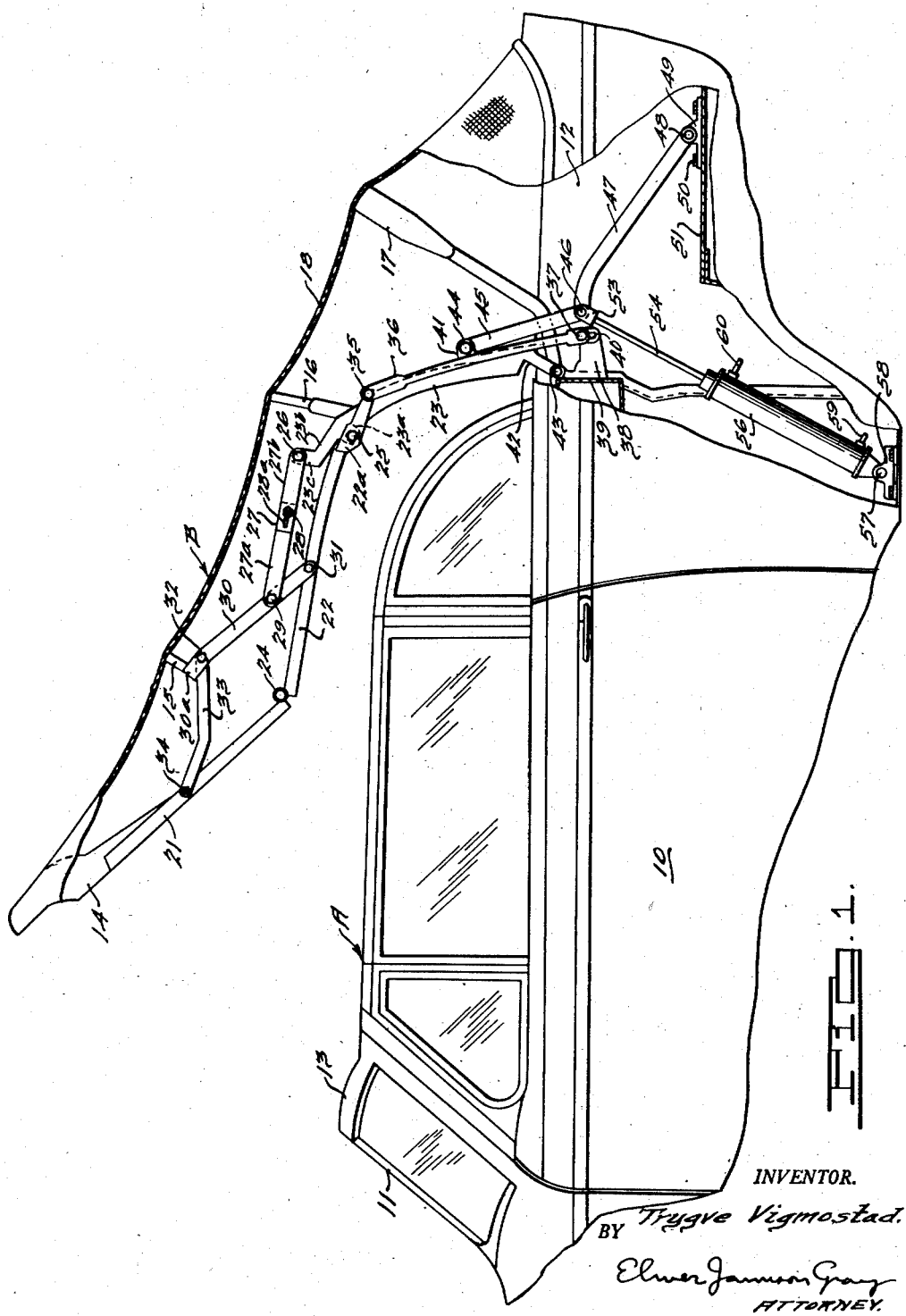

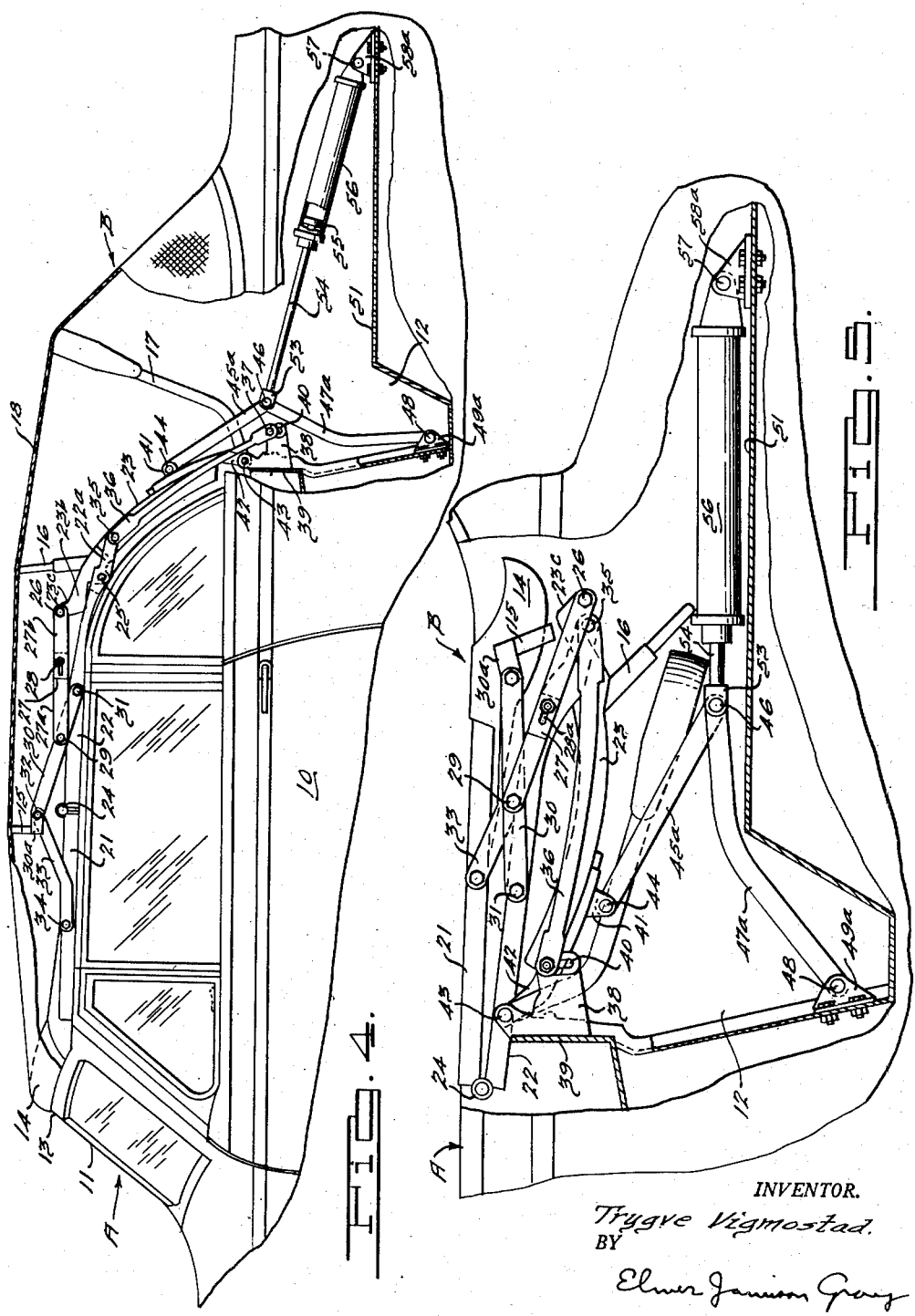

Patented Jan. 1, 1952

2,580,487

UNITED STATES PATENT OFFICE 2,580,487

FOLDABLE TOP FOR VEHICLE BODIES

Trygve Vigmostad, Detroit, Mich., assignor to Briggs Manufacturing Company, Detroit, Mich., a corporation of Michigan Application October 17, 1949, Serial No. 121,827

9 Claims. (Cl. 296—117)

This invention relates to foldable tops for automobile bodies of the convertible type, and in particular to an improved operating mechanism for folding and unfolding the top. This application is a continuation in part of my co-pending applications Serial Number 744,108, filed April 26, 1947, now abandoned; Serial Number 758,582, filed July 2, 1947, now Patent No. 2,560,496, dated July 10, 1951; and Serial Number 771,452, filed August 30, 1947, now abandoned.

An important object of the present invention is to provide a comparatively simple, highly efficient, and compact operating mechanism for raising and lowering the folding top of a convertible type automobile, the mechanism being particularly but not exclusively adapted for power actuation.

Another object is to provide a top operating mechanism of the foregoing character which is adapted to exert optimum force on the folding top structure at the initial stages of both folding and unfolding the latter.

Another and more specific object of the invention is to provide an improved foldable top structure for a vehicle body comprising pivotally connected side rail sections, including a rear rail section pivotally connected at its rear end to the body for swinging forward or rearward respectively to unfold or fold the top structure and also including toggle means operatively connected in improved manner with the rear rail section, the body, and reciprocating actuating means to assure an efficient, rapid, and sustained folding and unfolding action of the top, particularly in the initial stages of unfolding, and a powerful somewhat slowed action in the final stages of unfolding so as to force the top positively and completely to a desired unfolded position without slamming the top against the vehicle windshield header or comparable body structure, whereby the top may be conveniently fastened to said windshield header or other body structure in accordance with conventional practices with a minimum of manual positioning of the unfolded top with respect to the fastening means therefor.

In a preferred construction the toggle means comprises a pair of links pivotally connected at adjacent ends. One link is pivotally connected at its other end to the rear rail section and is movable generally endwise, particularly during the initial unfolding movement of the top. The second link is pivotally connected at its other end to the body, preferably so as to swing the generally endwise movable first link to a position approaching endwise alignment between the two links during the final unfolding movement of the top, whereby the full force of the straightening toggle is effective to force the top to its completely unfolded position in exact juxtaposition with the usual fastening means therefor.

Another object of the present invention is to provide a toggle type convertible top operating mechanism of the foregoing nature adapted to be actuated by a linearly extensible reciprocating means, as for example a hydraulically actuated plunger, which in a preferred construction is pivotally connected at one end to the toggle near the knee of the latter and is pivotally mounted on the body so as to extend substantially in endwise alignment with the first named generally endwise movable link during the initial unfolding movement of the top and substantially perpendicularly to the second named swinging link during the final unfolding movement of the top. By this structure, the full thrust of the plunger or other extensible actuating means is directed against the generally endwise movable link to assure a rapid and powerful operating stroke during the first stages of unfolding the top, and is directed to straighten the toggle during the latter stages of unfolding the top.

Other objects of this invention will appear in the following description and appended claims, reference being had to the accompanying drawings forming a part of this specification wherein like reference characters designate corresponding parts in the several views.

Fig. 1 is a fragmentary side elevation of a vehicle body, partly broken away and in section, illustrating a collapsible or foldable top partially in folded condition constructed in accordance with the present invention.

Fig. 2 is a reduced view similar to Fig. 1, showing the top in the fully unfolded condition.

Fig. 3 is an enlarged view similar to Fig. 1, showing the top supporting mechanism in the folded condition within a rear compartment of the vehicle, the top fabric being removed.

Fig. 4 is a view similar to Fig. 2, illustrating a modified form of the present invention.

Fig. 5 is an enlarged view similar to Fig. 4, showing the top supporting mechanism in the folded condition within a rear compartment of the vehicle, the top fabric being removed.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

In Figs. 1–3 there is illustrated, by way of example, a collapsible or foldable top constructed in accordance with one embodiment of the present invention as applied to a convertible body of the two door type. It will be understood, however, that the invention may be utilized in connection with other types of vehicles or automobile bodies, such as convertible bodies of the four door type. The body A is provided with a door 10 at each side, a windshield 11, and a collapsible or foldable top B adapted to be folded into a compartment or space 12 located between the rear seat of the body and the rear deck compartment, as illustrated in Fig. 3.

The windshield 11 terminates at its upper edge in a rigid transverse header 13, and the collapsible top B terminates at its forward edge in a transverse hollow header 14 adapted to engage the upper edge of the header 13 and to be clamped thereto by suitable manually operable mechanism located principally within the header 14 and actuated by means of a handle (not shown) accessible to the front seat passenger. When the header 14 of the foldable top is forced down into engagement with the upper edge of the windshield 13 it is preferably located in position by means of upright locating pins or studs on the header 13.

The collapsible or foldable top B includes a front bow 15, an intermediate or middle bow 16, and a rear bow 17 over which the fabric 18 of the top is stretched. The opposite side edges of this fabric are attached to the foldable side rails forming a part of the top assembly and hereinafter more fully described. The front edge portion of the fabric 18 covers and is secured to the header 14 and the rear edge thereof is attached to the body around the upper rear edge of the compartment 12.

Since the construction of the foldable top with reference to the side rails and operating linkage for the bows 15, 16 and 17 is the same at each side of the body, it will suffice to illustrate and describe the structure at one side of the body only. The foldable top is provided at each side with a sectional side rail extending from the header 14 to the rear of the body at a point adjacent the front upper edge of the compartment 12. This sectional side rail comprises a front rail section 21, an intermediate or middle rail section 22, and a rear rail section 23.

The rail sections 21 and 22 are arranged end to end in abutting relation when the top is unfolded and are hinged together at 24 so that the front rail section 21 may fold back over the intermediate section 22 when the top is folded, as shown in Fig. 3. The rear end of the rail section 22 is offset at 22a and is pivoted thereat by a pin 25 to a downwardly projecting portion 23a of the rear rail section 23. Rearwardly of the pivot 25 the rail offset extension 22a overlaps and crosses the upper part of the rear rail section 23, and the latter in turn is provided above the pivot 25 with a forwardly extending lever extension 23b which terminates in an upwardly offset arm portion 23c substantially above the intermediate rail section 22 when the top is in its unfolded position.

The arm or lever extension 23b, 23c of the rear rail section 23 is connected to the front rail section 21 through the medium of a series of articulated links or bars as a result of which effort exerted by the rear rail section 23, when swung in one direction or the other, is transmitted to the front rail section so as to positively fold or unfold the same. Accordingly, there is provided a sectional link or bar 27 comprised of relatively endwise adjustable link members 27a and 27b having their adjacent ends overlapped and adjustably connected together by means of a bolt and slot connection. The transverse bolt 28, forming part of this connection, is secured to the link member 27a and is slidable within a longitudinal slot 28a in the link member 27b, this bolt being rigidly clamped in adjusted position within the slot by means of lock nuts. Although the link or bar connection 27 may be made in one piece, I prefer to form the same into the relatively adjustable link members 27a and 27b, as a result of which the link connection 27 is extensible in character so as not only to compensate for variations in production but also to enable the header 14 in the final unfolded position of the top to assume the desired position with respect to the windshield header 13.

The member 27b of the extensible link connection 27 is pivoted at its rear end at 26 to the upper end of the offset arm portion 23c of the rear rail section. The forward end of the member 27a of this link connection is pivoted at 29 to an intermediate portion of a link 30. This latter link is pivoted at 31 to the intermediate rail section 22 at a suitable point between the ends thereof and in the normal unfolded position of the top extends forwardly and upwardly with respect to the side rail, as illustrated in Fig. 2. The inclined link 30 near its forward end is pivoted at 32 to a second inclined link 33 which is preferably elbow shaped so as to provide a portion extending downwardly and forwardly toward the front rail section 21 and a second portion extending parallel and alongside this rail section when the top is unfolded. The forward end of the inclined link 33 is pivoted at 34 to the front rail section 21 at a suitable point between the ends thereof. Thus, it will be seen that the arm or lever extension 23b, 23c of the rear rail section 23 is operatively connected to the front rail section through the medium of the articulated links 27, 30 and 33. The link 30 has an extension 30a beyond the pivot 32 which is rigidly secured to an end of the front bow 15.

The intermediate bow 16 is secured at opposite ends to the rear side rail sections 23, each point of connection being preferably somewhat to the rear of the pivot 25 between each associated pair of intermediate and rear rail sections. The rearwardly extending arm or lever extension 22a of each intermediate rail section 22 is pivoted at its rear end at 35 to the upper end of a link or bar 36. In the normal unfolded position of the top, this link 36 extends downwardly and rearwardly alongside the rear rail section 23 and is pivoted at its rear end at 37 to a bracket 38 rigidly secured to a cross frame member 39 of the body.

The pivotal connection between the link 36 and the bracket 38 is preferably adjustable so as to permit accurate installation of the top. This adjustable connection in the present instance comprises a bolt, forming the pivot 37, slidable within a vertical slot 40 in the bracket 38, the bolt being held in fixed adjusted position by means of lock nuts. Rigidly secured to the rail section 23 and forming a part thereof is a member 42 which extends downwardly and is pivoted at 43 to the bracket 38. By virtue of this construction it will be apparent that the rear rail section 23 will swing between the unfolded and folded positions of the top about the pivot 43.

The foldable top in the present embodiment is operated through the medium of power actuated mechanism which may be either of the hydraulic or pneumatic type, and this mechanism is connected to the rear rail section 23 and to a fixed portion of the body in order to fold the top into the compartment 12, as shown in Fig. 3, or unfold and extend it as shown in Fig. 2.

Integral with the rear rail section 23 is a projecting ear 41 to which is pivoted at 44 the upper end of a link 45. This link near its lower end is pivoted at 46 to a relatively long link 47 which in turn is pivoted at its rear end at 48 to a bracket 49 bolted at 50 to the deck 51 of the compartment 12. The links 45 and 47 provide a pair of pivotally connected toggle links having their joint at the pivot 46. The link 45 is the chief operating link for the top assembly and operates the assembly through its connection at 44 with the rear rail section 23.

Also pivotally connected to the toggle joint 46 is a clevis 53 which is secured to a piston rod 54. This piston rod is attached at its lower end to a piston 55 which is adapted to reciprocate within a cylinder 56. The lower end of the cylinder is pivotally connected at 57 to a bracket 58 bolted to a fixed part of the vehicle body. Accordingly, the cylinder 56 and piston rod 54 may swing as the top mechanism is operated in order to permit the toggle links 45, 47 to move into their proper positions and thus move the various elements of the top into their proper places both in the folded and unfolded positions.

The piston 55 and cylinder 56 may be of any suitable construction, either of the hydraulic or pneumatic type. In the present instance a hydraulic medium is utilized and fluid under pressure may be introduced at 59 to move the piston 55 upwardly within the cylinder for unfolding the top, and may be introduced at 60 to move the piston in the opposite direction for folding the top into the body.

The hydraulic mechanism is controlled in conventional manner through a push button on the instrument panel. When the piston 55 and piston rod 54 are shifted outwardly the toggle link 47 is swung upwardly, thus shifting link 45 upwardly and in an endwise manner from the position shown in Fig. 3 to the position shown in Fig. 2. Link 45 transmits a force directly to the rear rail section 23. Unfolding motion of the middle rail section 22 is controlled by the rear rail section and link 36 acting through arm extension 22a. The front rail section 21 is shifted positively to its unfolded position by the arm extension 23b, 23c of the rear rail section acting through link 27 which in turn acts upon link 33 through the connecting link 30. The rear rail section thus transmits a force to the front rail section through the medium of links 27, 30 and 33 which also act to properly position the front bow 15. The reverse operation to the foregoing occurs when the hydraulic mechanism is actuated to fold the top assembly and shift it from the position shown in Fig. 2 to the collapsed position shown in Fig. 3.

In appreciation of the present invention, it is important to observe that the operation of the top B in folding or unfolding takes place in accordance with the rearward or forward swinging respectively of the rear rail section 23, which in turn is swung by a novel and particularly efficient operating means including the toggle 45, 47 and plunger 54. The basic concept of operating a folding top mechanism in response to the movement of a swinging rear rail section is commonly employed with various types of top mechanisms, so that the present operating means will find numerous applications.

As the rear rail section 23 swings about the pivot 43, the pivot 44 for the upper end of the toggle link 45 will scribe an arc about the pivot 43. It is thus only necessary to guide the lower pivot 43 downward through a suitable path to effect a substantially endwise movement for the link 45 throughout the swinging movement of the rear rail section 23, leading the latter downward to the folded position, or forcing the latter upward to the unfolded position. In the present instance, the guided movement of the pivot 46 or lower end of the link 45 is effected by the toggle link 47 comprising a radius arm swinging about the pivot 48.

It is also to be noted that the pivot 48 is suitably disposed so that the toggle links 45, 47 approach a position of endwise alignment when the top is in the unfolded position. The hydraulic piston 54 and plunger 56 are arranged so as to be substantially perpendicular to the link 47 when the top is in the unfolded position and to be in substantially endwise alignment with the link 45 when the top is in the folded position. As a consequence, the aforementioned advantages and objects of the present invention are readily accomplished.

For example in the initial unfolding movement of the top, the full force of the plunger 54 is directed substantially along the aligned link 45 to move the same endwise in a powerful rapid top raising stroke, which assures a smooth, steady, positive operation of the top in unfolding which has not heretofore been obtained with comparable mechanisms. At the same time, the movement guiding link 47 meets the plunger 54 at a large angle which approaches a right angle in the unfolded position of the top, so that but a small portion of the thrust of the plunger 54 is directed along the link 47. Even this force approaches zero as the top moves to the unfolded position, Fig. 2. It is thus seen that a primary function of the link 47 is to guide the movement of the pivot 46, since the effective force of the plunger 54, either in raising or lowering the top, is directed to the rear rail section 23 through the generally endwise movable link 45.

Also by virtue of the present construction, as the top approaches the unfolded position and the toggle links 45, 47 approach the position of endwise alignment, Fig. 1, the ratio of the force directed into the link 45, moving the same endwise to complete the top unfolding movement, to the generally perpendicularly directed force exerted by the plunger 54 approaches an infinite magnitude. Accordingly a comparatively light force exerted by the plunger 54 will exert a tremendous force effective to move the top positively and completely to its unfolded position. As a result, the movement of the top is absolutely controlled and the latter may be positioned repeatedly and for all practical purposes exactly at a desired unfolded position to permit the aforesaid latching between the header bars 13 and 14, or other suitable latching means, without recourse to manual adjustment or positioning of the unfolded top.

Preferably of course, the links 45, 47 never quite reach or pass the position of endwise alignment as the plunger 54 nears the limit of its extension. Otherwise, the top would begin to fold upon continued extension of the plunger and efficient control over the final position of the unfolded top would be lost.

Referring to Figs. 4 and 5, it will be observed that all the advantages and objects of the present invention will of course be achieved by substantially interchanging the plunger 54 and swinging link 47. In such a situation, the base of the cylinder 56 is pivotally connected at 57 to a bracket 58a which in turn is bolted to the deck 51. The lower end of a swinging link 47a is pivotally connected at 48 to a bracket 49a which in turn is bolted to a frame portion of the body near the forward lower portion of the compartment 12. The link 47a and a generally endwise movable link 45a are pivotally connected together and to the end of the plunger 54 by a pivot 46. The upper end of the link 47a is pivotally connected at 44 to the boss 41 of the rear rail section 23.

By comparing Fig. 3 with Fig. 5, and Figs. 1 and 2 with Fig. 4, it is apparent that the toggle links 45a and 47a are comparable in function and operation to the links 45 and 47 respectively. The remaining structures shown in Figs. 4 and 5, including the top B, are the same as the correspondingly numbered parts in Figs. 1-3.

In either modification, the toggle link pivotally connected to the rear rail section 23 moves generally endwise and is substantially endwise alignment with the reciprocating plunger during the initial stages of unfolding the top. The other toggle link pivotally connected to the body swings upward to a position generally perpendicular to the plunger and in endwise alignment with the endwise movable link, serving also as a radius arm to guide the endwise movement of the latter link. The plunger 54 in Figs. 4 and 5, as in Figs. 1-3, meets the link 47a at a comparatively large angle, which increases to substantially a right angle at the limit of the unfolding movement, so that at no time is an appreciable component of the thrust of the plunger 54 directed ineffectively along the link 47a. In consequence, this thrust is effectively directed as required to move the link 45a endwise in the manner discussed above in connection with Figs. 1-3.

I claim:

1. A foldable top for a vehicle body comprising side rail sections including a rear rail section pivotally connected to the body adjacent its rear end, a toggle member pivotally connected at one end to the rear rail section and shiftable generally endwise during the initial opening movement of the top, a second toggle member pivotally connected at one end to the body, adjacent ends of said toggle members being pivotally connected together, a top operating member pivotally connected directly to one of said toggle members adjacent the pivotal connection therebetween, and means for imparting generally endwise shiftable motion to said operating member during the initial opening movement of the top thereby to shift said first named toggle member also generally endwise.

2. A foldable top for a vehicle body comprising side rail sections adapted to extend substantially end to end when the top is open and including a rear side rail section pivotally connected to the body adjacent its rear end, a toggle link pivotally connected at one end to the rear rail section and shiftable generally endwise during the initial opening movement of the top, a second toggle link pivotally connected at one end to the body, adjacent ends of said links being pivotally connected together, a top operating member pivotally connected directly to one of said toggle links adjacent the pivotal connection therebetween, power operated means for reciprocating said operating member and for imparting generally endwise shiftable motion to said operating member during the initial opening movement of the top thereby to shift said first named toggle link also generally endwise.

3. A foldable top for a vehicle body comprising side rail sections adapted to extend substantially end to end when the top is open and including a rear side rail section pivotally connected to the body adjacent to its rear end, a toggle link pivotally connected at one end to the rear rail section and shiftable generally endwise during the initial opening movement of the top, a second toggle link pivotally connected at one end to the body, adjacent ends of said links being pivotally connected together, a top operating member pivotally connected directly to one of said toggle links adjacent the pivotal connection therebetween, said operating member and first named toggle link extending generally endwise with respect to each other in the folded or closed position of the top, and means for imparting generally endwise shiftable motion to said operating member during initial opening movement of the top thereby to impart to said first named toggle link a generally endwise linear travel corresponding substantially to the travel of the operating member.

4. A foldable top for a vehicle body comprising side rail sections including a rear rail section pivotally connected to the body adjacent its rear end, a toggle member pivotally connected at one end to the rear rail section and shiftable generally endwise during the initial opening movement of the top, a second toggle member pivotally connected at one end to the body, adjacent ends of said toggle members being pivotally connected together, a top operating member pivotally connected directly to one of said toggle members adjacent the pivotal connection therebetween, and means for imparting generally endwise shiftable motion to said operating member during the initial opening movement of the top thereby to shift said first named toggle member also generally endwise, said first named toggle member extending approximately perpendicular to the rear rail section in the folded or closed position of the top.

5. A foldable top for a vehicle body comprising side rail sections including a rear rail section pivotally connected to the body adjacent its rear end, a toggle member pivotally connected at one end to the rear rail section, a second toggle member pivotally connected at one end to the body at a point spaced rearwardly of the pivotal connection of the first named toggle member to the rear rail section in the folded position of the top, adjacent ends of said toggle members being pivotally connected together, and a top operating member pivotally connected directly to one of said toggle members and being shiftable generally endwise to impart generally endwise travel to the first named toggle member during initial opening movement of the top.

6. A foldable top for a vehicle body comprising side rail sections including a rear rail section pivotally connected to the body adjacent its rear end, a toggle member pivotally connected at one end to the rear rail section and shiftable generally endwise during the initial opening movement of the top, a second toggle member pivotally connected at one end to the body, adjacent ends of said toggle members being pivotally connected together rearwardly of the pivotal connections between said toggle members and the rear rail section and body respectively in the closed or folded position of the top, a top operating member pivotally connected directly to one of said toggle members adjacent the pivotal connection therebetween, and means for imparting generally endwise shiftable motion to said operating member during the initial opening movement of the top thereby to shift said first named toggle member also generally endwise.

7. A foldable top for a vehicle body comprising side rail sections including a rear rail section pivotally connected to the body adjacent its rear end, a toggle member pivotally connected at one end to the rear rail section, a second toggle member pivotally connected at one end to the body at a point spaced rearwardly of the pivotal connection of the first named toggle member to the rear rail section in the folded position of the top, adjacent ends of said toggle members being pivotally connected together, a top operating member pivotally connected to one of said toggle members and being shiftable generally endwise to impart generally endwise travel to the first named toggle member during initial opening movement of the top, and means for reciprocating said operating member, said means being mounted on the body forwardly of said second toggle member.

8. A foldable top for a vehicle body comprising side rail sections including a rear rail section pivotally connected to the body adjacent its rear end, a toggle member pivotally connected at one end to the rear rail section, a second toggle member pivotally connected at one end to the body, adjacent ends of said toggle members being pivotally connected together, a top operating member pivotally connected to one of said toggle members and being shiftable generally endwise to impart generally endwise travel to the first named toggle member during initial opening movement of the top, and means for reciprocating said operating member, said means being mounted on the body rearwardly of the pivotal connection between said toggle members.

9. A foldable top for a vehicle body comprising side rail sections including a rear rail section pivotally connected to the body adjacent its rear end, a toggle member pivotally connected at one end to the rear rail section and shiftable generally endwise during the folding movement of the top at or near one limit of its travel, a second toggle member pivotally connected at one end to the body, adjacent ends of said toggle members being pivotally connected together, a top operating member pivotally connected directly to one of said toggle members adjacent the pivotal connection therebetween, and means for imparting generally endwise shiftable motion to said operating member during folding movement of the top at or near said limit of its travel thereby to shift said first named toggle member generally endwise.

TRYGVE VIGMOSTAD.

REFERENCES CITED

The following references are of record in the file of this patent:

UNITED STATES PATENTS

| Number | Name | Date |
| --- | --- | --- |
| 2,079,232 | Smith | May 4, 1937 |
| 2,267,471 | Keller | Dec. 23, 1941 |
| 2,274,668 | Crawford et al. | Mar. 3, 1942 |
| 2,372,583 | Keller | Mar. 27, 1945 |

FOREIGN PATENTS

| Number | Country | Date |
| --- | --- | --- |
| 528,831 | Great Britain | Nov. 7, 1940 |